United States Patent [19]

Able et al.

[11] Patent Number: 5,113,660

[45] Date of Patent: May 19, 1992

[54] HIGH TEMPERATURE COMBUSTOR LINER

[75] Inventors: Edward C. Able, Tolland; Martin J. Gibler, Manchester, both of Conn.

[73] Assignee: The United States of America as represented by the Secretary of the Air Force, Washington, D.C.

[21] Appl. No.: 545,326

[22] Filed: Jun. 27, 1990

[51] Int. Cl.$^5$ ............................................. F23R 3/60
[52] U.S. Cl. ...................................... 60/752; 60/753; 110/339
[58] Field of Search .............. 60/752, 753, 755, 39.32; 110/339, 340

[56] References Cited

U.S. PATENT DOCUMENTS

| | | | |
|---|---|---|---|
| 2,548,485 | 4/1951 | Lubbock | 60/753 |
| 2,919,549 | 1/1960 | Haworth et al. | 60/753 |
| 3,956,886 | 5/1976 | Sedgwick | 60/39.69 |
| 4,071,194 | 1/1978 | Eckert et al. | 239/127.3 |
| 4,302,941 | 12/1981 | DuBell | 60/757 |
| 4,512,159 | 4/1985 | Memmen | 60/752 |
| 4,614,082 | 9/1986 | Sterman et al. | 60/39.32 |
| 4,748,806 | 6/1988 | Drobny | 60/39.32 |
| 4,749,029 | 6/1988 | Becker et al. | 165/47 |
| 4,773,227 | 9/1988 | Chabis | 60/757 |
| 4,898,122 | 2/1990 | Black | 110/339 |

FOREIGN PATENT DOCUMENTS 1487064  9/1977  United Kingdom .................. 60/753

*Primary Examiner*—Richard A. Bertsch
*Assistant Examiner*—Timothy S. Thorpe
*Attorney, Agent, or Firm*—Thomas C. Stover; Donald J. Singer

[57] ABSTRACT

A combustor shield assembly is provided wherein a plurality of ceramic tiles are mounted on a ceramic support panel, which panel has a plurality of keyhole-shaped apertures therethrough to receive a plurality of ceramic tiles, each of which has a knob upstanding on a neck from the base or shield of such tile, each of the knobs being sized to fit through the larger end of the apertures, but not the smaller end thereof to provide a bearing and support surface for such knob and thus for the tiles. An apertured retaining panel is provided, having apertures slightly larger than the knobs, which panel is positioned over the top of the support panel with the apertures thereof around the respective knobs to secure the tiles in place in the support panel. A plurality of the so-assembled tiles on their respective support panel are mounted in spaced overlapping layers to a combustor liner so as to mount the tiles before the liner as a heat shield therefor. In addition air inlet passages are provided between each such tile assembly so that cooling air can be input between the above tile assembly layers to further cool and protect the combustor liner in concert with such tile assemblies. In a preferred embodiment, an insulating layer or blanket is positioned on the back side of each tile around its support knob, between tile and support panel to further insulate such panel and provide a cushion for the brittle ceramic tiles.

10 Claims, 3 Drawing Sheets

HIGH TEMPERATURE COMBUSTOR LINER

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a high-temperature combustor liner for heated bodies, particularly a combustor liner lined with tile.

2. The Prior Art

It has been found desirable to line combustors, e.g., combustion chambers, flame tubes and the like with ceramic tiles to enable the chamber structure to better withstand high temperatures e.g., the combustor of a jet engine benefits from such a protective liner.

For examples of such liners in combustors or flame tubes see U.S. Pat. No. 3,956,886 to Sedgwick (1976), U.S. Pat. No. 4,512,159 to Memmen (1985) and U.S. Pat. No. 4,773,227 to Chabis (1988). These references teach hanging tiles in a chamber (to be heated) by tongue and groove, post and spring clip and hanger and slot, respectively. Undue complexity of installation, of removal or replacement, results. And there is a need and market for an improved ceramic tile assembly which overcomes the above prior art shortcomings.

There has now been developed a ceramic tile assembly wherein ceramic tiles are readily installed in a support panel in e.g., a combustor liner and then locked in place and yet are readily removable for replacement purposes.

SUMMARY OF THE INVENTION

Broadly the present invention provides a combustor liner comprising a support panel having a plurality of apertures therein, which apertures each have a wide portion and a narrow portion, a plurality of ceramic tiles, each tile having a knob upstanding on a neck from a face of such tile, each of the knobs being sized to fit through the larger end of the apertures but not the smaller end thereof, the knobs being inserted through the larger end of the apertures and shifted over the smaller end thereof and over the support panel, the necks passing therethrough and supporting the tiles below the support panel. Holding means are provided to secure the knobs, proximate the smaller ends of the apertures and means are provided to mount the support panel to the combustor liner so as to mount the tiles before the liner as a heat shield therefor.

In one embodiment an insulating layer is positioned on the face of the tile between it and the support panel therebehind, to cushion the tile and further insulate the support panel and thus the combustor liner.

BRIEF DESCRIPTION OF THE DRAWINGS

The invention will become more apparent from the following detailed specification and drawings in which.

DESCRIPTION OF PREFERRED EMBODIMENTS

Figure 1:
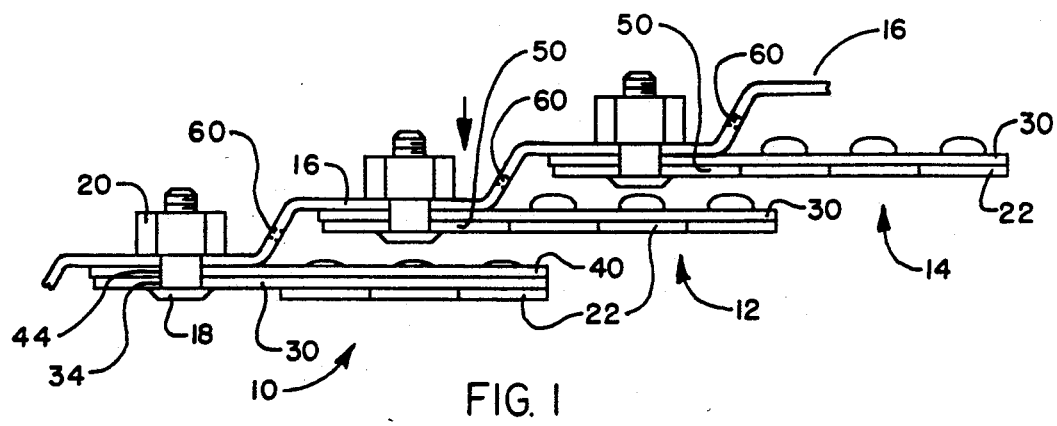
FIG. 1 is a partial sectional elevation view of the combustor liner tile assembly embodying the present invention.

Referring in more detail to the drawings, tile assemblies 10, 12 and 14 are mounted to metal liner shell 16 by bolts 18 and nuts 20, as shown in FIG. 1. The tile assembly 10 includes tiles 22 mounted to support panel 30 at keyholes 32, which panel 30 is secured to the liner shell at bolt holes 34 as shown in FIGS. 1 and 6.

Figure 4:
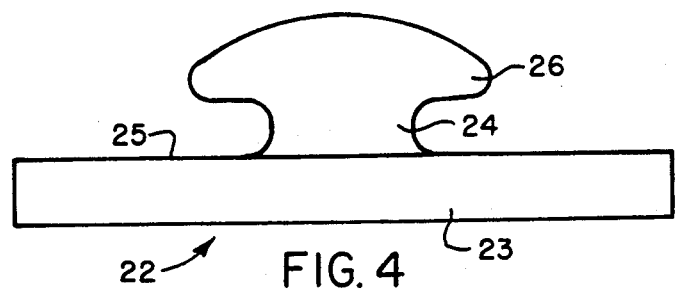
FIG. 4 is a side-elevation view of a tile embodying the present invention.
Figure 5:
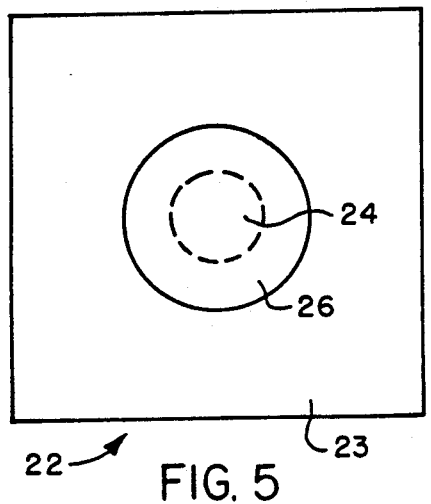
FIG. 5 is a plan view of the tile embodiment shown in FIG. 4.
Figure 10:
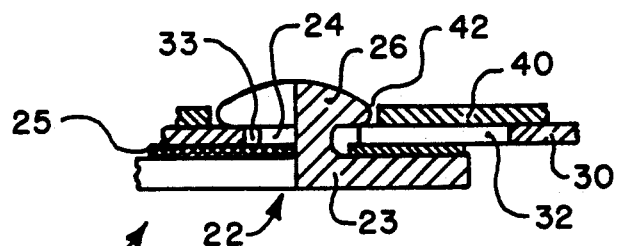
FIG. 10 is an elevation view, partly in section, of the tile assembly of FIG. 9, taken on lines 10—10, looking in the direction of the arrows.
Figure 11:
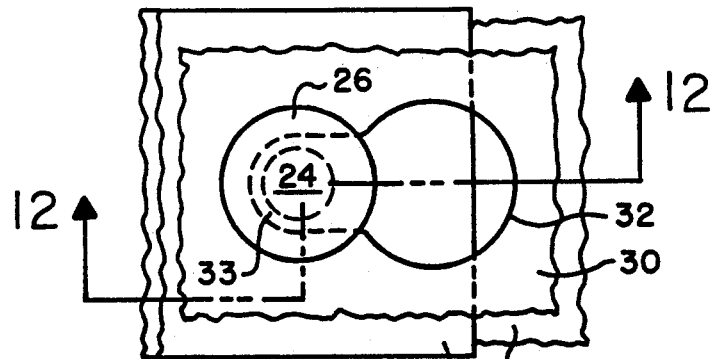
FIG. 11 is a plan view of another assembly embodiment of the invention.
Figure 12:
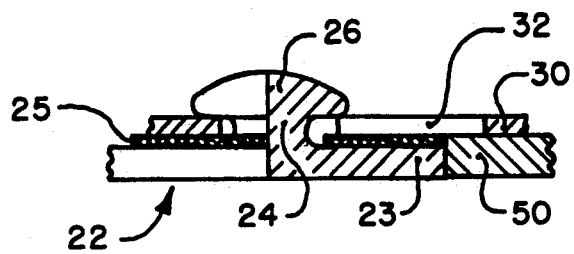
FIG. 12 is an elevation view, partly in section, of the tile assembly of FIG. 11 taken on lines 12—12 looking in the direction of the arrows.

Each tile 22 has a flat shield portion 23 connected by a neck 24 to a knob 26, as shown in FIGS. 4, 5 and 10. Desirably, an insulating layer 25 fits around the neck 24 and lies against the rear face of the flat shield portion 23, as shown in FIG. 10.

Figure 6:
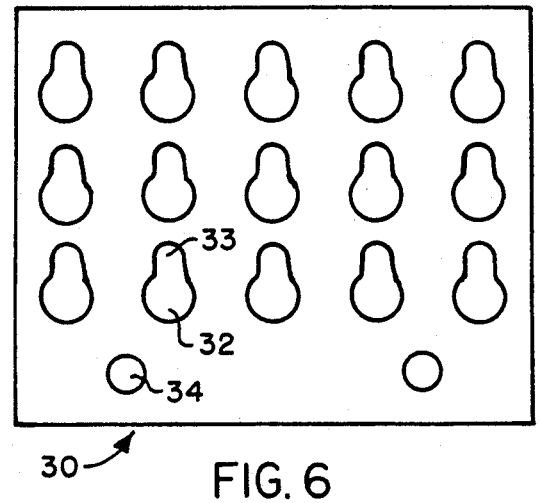
FIG. 6 is a plan view of another component of the tile assembly embodying the invention.
Figure 9:
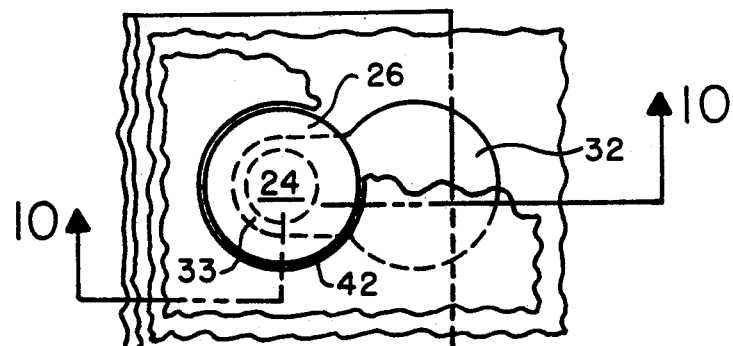
FIG. 9 is a plan view of a portion of a tile assembly embodying the present invention.

Each tile 22 is installed by slipping a knob 26 thereof, through the wide end of the keyhole 32 and sliding it toward the small end 33 of such keyhole, which provides a knob bearing surface therefor, as indicated in FIG. 6 and shown, e.g., in FIGS. 9 and 10.

Figure 3:
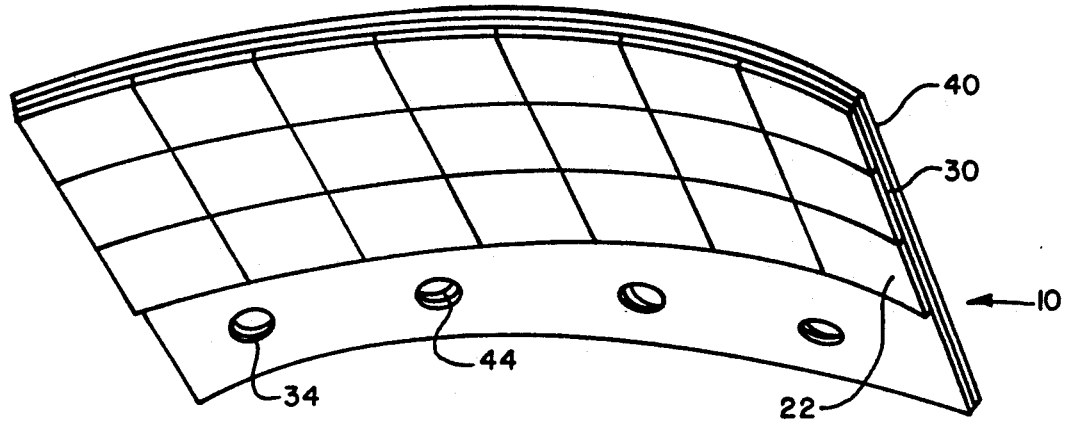
FIG. 3 is a perspective view of the tile assembly of the invention shown in FIGS. 1 and 2.
Figure 7:
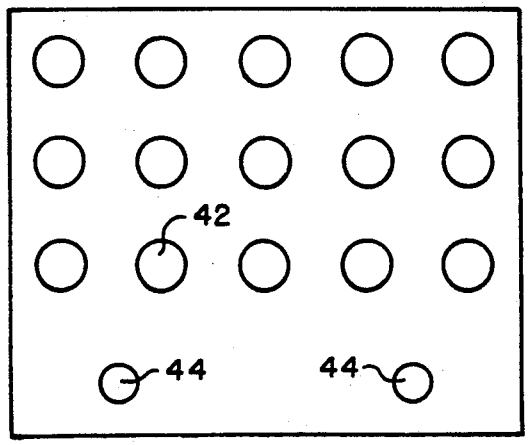
FIG. 7 is a plan view of another component embodying the tile assembly of the present invention.
Figure 8:
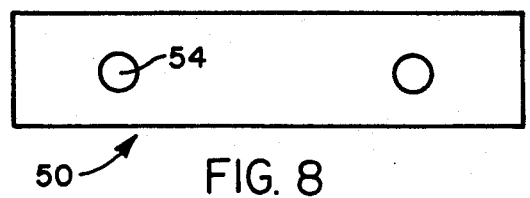
FIG. 8 is a plan view of yet another component embodying the tile assembly of the present invention.

The tiles 22, so mounted in the support plate 30, are held in place one of two ways. The first such system is retaining panel 40, which has apertures 42 slightly larger in diameter than the knobs 26 and which has a pair of bolt holes 44, as shown in FIGS. 7 and 9. The retaining panel 40 mounts atop the support panel 30 so that its apertures 42 surround the knobs 26 of one or a plurality of tiles 22, to hold such tiles in place at the small end of each keyhole 33, as shown or indicated in FIGS. 1, 9 and 10. The bolt 18 passes through the bolt holes 34 and 44 of the respective panels 30 and 40, to secure them to the liner shell 16, as shown or indicated in FIGS. 1 and 3.

In the other system, the retaining panel is omitted and a narrower anchor panel 50 having bolt holes 54, is positioned below the support panel 30, up against the edges of the flat shield portions 23 of the tiles 22, to prevent their sliding out of position, as shown or indicated in FIGS. 8, 11, 12 and 1.

Figure 2:
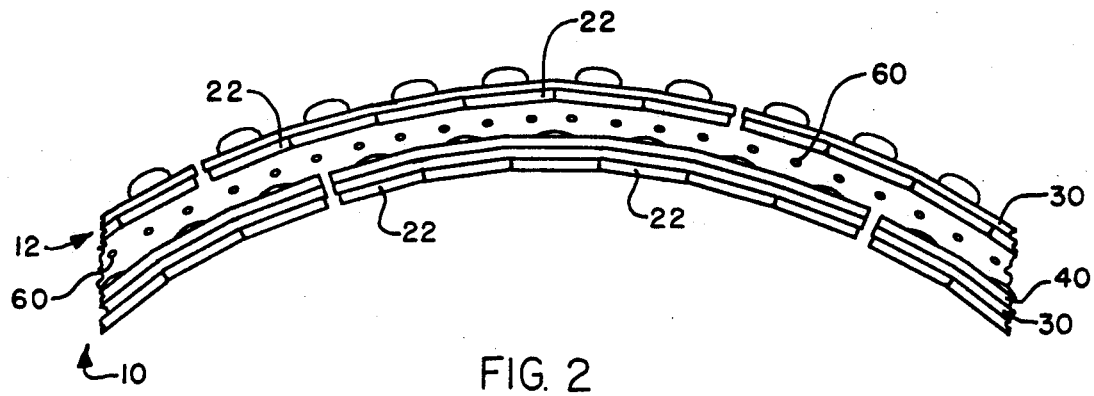
FIG. 2 is an end-elevation view of the tile assembly of the invention shown in FIG. 1.

The tile panel assemblies 10, 12 and 14 are positioned in shingled or spaced overlapping array with air passages 60 therebetween, as shown in FIGS. 1 and 2. A portion of the tile panel assembly 10, is shown in perspective in FIG. 3.

Thus the combustor liner with ceramic tile assembly of the invention, employs high temperature stable ceramic tiles as individually suspended, non-load bearing heat shields, which shield a less brittle and tougher but also less heat resistant combustor liner.

The overlapping or shingled tile assembly of the invention is suitably used in high temperature chambers such as a combustor for a jet engine or a flame tube and the like.

Suitable materials for the ceramic tiles embodying the invention are various high temperature (above 2000° F.) ceramic tile materials including silicon carbide, silicon nitride and zirconia.

The liner and/or the retaining panels can be of metal but desirably are of e.g., a ceramic composite made with continuous silicon carbide fibers infiltrated with a glass matrix.

Such liner, as noted above, provides a tough support for individually suspended, non-load bearing heat shields, which shields in turn, protect such liner from high temperatures as does the airflow that passes between the overlapping layers of tile assemblies, e.g., through the apertures 60, as discussed above in FIGS. 1 and 2.

The tiles can be of various shield sizes, e.g., about 0.70 in square by about 0.06 in thick.

The above tile blanket layer can be a layer of ceramic fiber insulating blanket material including alumina or zirconia felts. Such insulating blanket further minimizes imposed strains in the tile support posts, reducing risk of fracture thereat. Of course the insulating tile blanket can be dispensed with if desired, within the scope of the present invention.

Per the invention, damaged tiles are readily removed from their respective support panels and replaced, by removing the tile retaining panel above or below the tile support and replaced panel as discussed above.

The apertures in the retaining panel are preferably keyhole in shape, as discussed above within the scope of the invention. However, such apertures can be of various shapes, angular or rounded or a combination thereof, provided there is a larger end which narrows down to a smaller end, to provide a bearing surface for the tile knobs, as discussed above.

What is claimed is:

1. A combustor liner comprising a support panel having a plurality of apertures therein, which apertures each have a wide portion and a narrow portion, a plurality of ceramic tiles, each tile having a knob upstanding on a neck from a face of such tile, each of said knobs being sized to fit through the larger end of said apertures but not the smaller end thereof, said knobs being inserted through the larger end of said apertures and shifted over the smaller end thereof and over said support panel, said necks passing therethrough and supporting said tiles below said support panel, holding means to secure said knobs proximate the smaller ends of said apertures and means to mount said support panel to said combustor liner so as to mount said tiles before said liner as a heat shield therefor.

2. The liner of claim 1, wherein said aperture is keyhole shaped.

3. The liner of claim 1, wherein an insulating layer is positioned on the face of said tile around and proximate the upstanding neck thereof, between the tile face and said support panel to cushion said tile and further insulate said support panel and said liner.

4. The liner of claim 1, wherein said holding means is a holding sheet having a plurality of apertures, sized to fit over said knobs in close clearance therewith, when said holding sheet is mounted on said support panel.

5. The liner of claim 1, wherein said holding means is an under sheet which mounts under said support panel against an edge of at least one so-hung tile to confine the neck thereof proximate the smaller end of an aperture in said support panel.

6. The combustor liner of claim 4, having a plurality of said tiles mounted in close array to said support panel, which tile support panel is mounted in turn, to said combustor liner.

7. The combustor liner of claim 6, having a plurality of the tile support panels of claim 6 mounted to said combustor liner.

8. The combustor liner of claim 6, having a plurality of the tile support panels of claim 6 mounted to said combustor liner in spaced overlapping array.

9. The combustor liner of claim 8, wherein said liner has at least one aperture between at least one pair of spaced overlapping tile support panels to permit a cooling gas inflow therebetween to further thermally protect such liner.

10. The combustor liner of claim 9, mounted in the combustion chamber of a jet engine to protect the shell of said combustion chamber from the hot core gases of such combustion chamber.

* * * * *